United States Patent Office 3,728,304
Patented Apr. 17, 1973

3,728,304
FLAME-RETARDING ORGANIC SYNTHETIC
HIGH POLYMER COMPOSITION
Shoichi Hirao and Akira Taniuchi, Kyoto, Takuji Nakano,
Suita, and Masahiko Miyazaki, Kyoto, Japan, assignors
to Dai-Ichi Kogyo Seiyaku Co., Ltd., Kyoto, Japan
No Drawing. Filed Mar. 2, 1971, Ser. No. 120,344
Claims priority, application Japan, Mar. 13, 1970,
45/21,746
Int. Cl. C09k 3/28
U.S. Cl. 260—45.75 K                    8 Claims

ABSTRACT OF THE DISCLOSURE

A halogen-containing organic compound, which is represented by the formula,

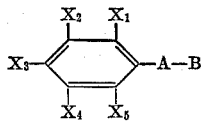

wherein $X_1$, $X_2$, $X_3$, $X_4$ and $X_5$ are individually an alkyl, haloalkyl, alkoxy or haloalkoxy group having 1 to 3 carbon atoms, or a halogen or hydrogen atom; A is an oxygen or sulfur atom; and B is a branched-chain alkyl, haloalkyl, hydroxyalkyl or hydroxyhaloalkyl group having 4 or more carbon atoms, and which compound has at least one halogen atom in the molecule, imparts excellent flame-retardancy to an organic synthetic high polymer and, at the same time, scarcely bleeds in said high polymer, is excellent in compatibility therewith and further imparts plasticity thereto.

---

This invention relates to an organic synthetic high polymer composition containing a specific halogen-containing organic compound.

Recently, the utilization of organic natural high polymers and the production and utilization of organic synthetic high polymers have been greatly developed, in general, and the said polymers have widely been used in large quantities for domestic and industrial textiles, daily necessaries, interior decorations, building materials and constructions. However, these organic natural and synthetic high polymers are composed essentially of hydrocarbons and hence are readily ignitable and inflammable, so that they have considerably been restricted in uses.

In order to make these polymers flame-retardant, there have been adopted such procedures that various phosphorus compounds and halogen-containing organic compounds are added as flame-retardants.

Organic synthetic high polymers, in particular, are used in markedly large quantities in various fields, and the kinds of organic synthetic high polymers required to be flame-retardant and self-extinguishing are diverse. Accordingly, flame-retardants for organic synthetic high polymers should satisfy many and complicated requirements.

In case flame-retardant compounds added to organic synthetic high polymers are less in compatibility with the polymers, no homogeneous mixing of the two can be attained, and the compounds cannot display their latent flame-retarding ability and give detrimental influence to the physical properties of the polymers. In view of the uses of the resulting compositions, the flame-retardant compounds are desirably low in bleeding from the organic synthetic high polymers. It is an important condition that the compounds should not give any detrimental effects to the moldability of the polymers and to the mechanical properties of the molded articles. It is also important that the compounds do not disturb the actions of such additives as plasticizers, lubricants, antioxidants, colorants, stabilizers and ultraviolet absorbers. Further, it is desirable if plasticity is imparted to the polymers by addition of the flame-retardant compounds.

However, there has been found no flame-retardant compound for all the organic synthetic high polymers which can satisfy the above-mentioned conditions.

Deeply interested in the aforesaid points, the present inventors made extensive studies to find that when added to the organic synthetic high polymers, flame-retardant compounds represented by the Formula I shown below display excellent properties.

It is therefore an object of the present invention to provide an organic synthetic high polymer composition containing a halogen-containing organic compound represented by the Formula I,

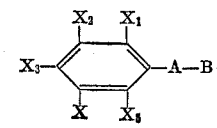     (I)

wherein $X_1$, $X_2$, $X_3$, $X_4$ and $X_5$ are individually an alkyl, haloalkyl, alkoxy or haloalkoxy group having 1 to 3 carbon atoms, or a halogen or hydrogen atom; A is an oxygen or sulfur atom; and B is a branched-chain alkyl, haloalkyl, hydroxyalkyl or hydroxyhaloalkyl group having 4 or more carbon atoms, which compound contains at least one, preferably 3 to 8, halogen atoms in the molecule.

The terms "halogen" and "halo" used herein and in the attached claims means, Cl, Br and F.

The halogen-containing compound used in the present invention is excellent in compatibility with an organic synthetic high polymer, scarcely bleeds in the polymer, and displays a proper plasticizing ability. The said halogen-containing compound is added in a small amount to an organic synthetic high polymer to give a composition excellent in flame-retardancy and self-extinguishability.

The halogen-containing organic compound used in the present invention is a compound of the Formula I, in which the group

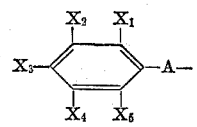

includes, for example, phenoxy, monochlorophenoxy, dichlorophenoxy, trichlorophenoxy, tetrachlorophenoxy, pentachlorophenoxy, monobromophenoxy, dibromophenoxy, tribromophenoxy, tetrabromophenoxy, pentabromophenoxy, monofluoromonobromo-dichlorophenoxy, methyldibromophenoxy, methyl tetrabromophenoxy, chloroethyl-dibromophenoxy, methoxydichlorophenoxy, ethoxytetrachlorophenoxy and chloroethoxy-dibromophenoxy groups, and thiophenoxy groups corresponding thereto; and the group B includes, for example, 1,2,3-trichloro-1-chloromethylpropyl,
1,2,3-tribromo-1-bromomethylpyropyl,
2,3-dibromo-1-fluoro-2-fluoromethylpropyl,
2,3-dichloro-1-bromo-1-bromomethylpropyl,
2,3-dichloro-2-methylpropyl,
2,3-dibromo-2-methylpropyl,
2,3-difluoro-2-methylpropyl,
2-fluoro-4-chloro-2-fluoromethylbutyl,
2-chloro-4-chloro-2-chloromethylbutyl,
2-bromo-4-bromo-2-chloromethylbutyl,
2,2-dimethyl-3-chloropropyl,
2,2-dihydroxymethyl-3-chloropropyl,
2,2-di(chloromethyl)-3-chloropropyl,
2,2-dimethyl-3-bromopropyl,
2,2-dihydroxymethyl-3-bromopropyl, 2,2-di(bromomethyl)-3-bromopropyl, and 2,2-di(fluoromethyl)-3-fluoropropyl groups.

The halogen-containing compound used in the present invention is obtained by reacting one member selected from phenols, halogenated phenols, alkylphenols, haloalkylphenols, alkoxyphenols, haloalkoxyphenols and thiophenols thereof with one member selected from alkyl halides, haloalkyl halides, hydroxyalkyl halides and hydroxyhaloalkyl halides in the presence of caustic alkali and in the presence or absence of a solvent, and, if necessary, halogenating the reaction product. Alternatively, the compound is obtained by reacting one member selected from phenols, halogenated phenols, alkylphenols, haloalkylphenols, alkoxyphenols, haloalkoxyphenols and thiophenols thereof with one member selected from alkenyl halides and haloalkenyl halides in the presence of caustic alkali and in the presence or absence of a solvent, and halogenating the unsaturated bond of alkenyl group of the reaction product in the presence or absence of a solvent.

The halogen-containing organic compound used in the present invention may be added to any of organic synthetic high polymers such as polymers and copolymers of ethylene, propylene, acrylonitrile, acrylic acid ester, methacrylic acid ester, vinyl acetate and vinyl chloride, and such curable resins as unsaturated polyester resins. Particularly, the compound shows excellent applicability to styrene polymers, styrene-acrylonitrile copolymers, styrene-acrylonitrile-butadiene copolymers and the like styrene type polymers.

The amount of the halogen-containing organic compound contained in the flame-retarding organic synthetic high polymer composition of the present invention is preferably 0.5 to 20% by weight based on the weight of the composition. The halogen-containing organic compound may be added at any time of polymerization, molding, spinning and the like operation of the organic synthetic high polymers.

The flame-retarding organic synthetic high polymer compositions of the present invention are usable for resin molded articles, film products, coating materials such as paints and the like, fibrous materials and other high polymer materials. If necessary, the present compositions may be incorporated with halogen-containing alkyl phosphates and phosphites, metal oxides, alkyl metal compounds, other flame-retardants and flame-retarding adjuvants, in combination with the halogen-containing organic compounds.

Halogen-containing hydrocarbons and halogen-containing aromatic compounds such as tetrabromoethane, dibromoethylbenzene, dibromopropanol and the like, which have heretofore been known as flame-retardants, have such drawbacks that even when they are added to synthetic resins, the resulting compositions are low in heat stability, and when they are added in small amounts, the synthetic resins become soft and liberate irritative odor, and that they are volatile and hence volatilize when the compositions are allowed to stand for a long period of time, with the result that they cannot display flame-retarding effects inherent thereto. However, no such drawbacks are seen in the present halogen-containing organic compounds represented by the Formula I.

British Pats. Nos. 1,079,984, 1,100,605, 1,107,283, 1,142,298, 1,157,116, 1,158,163 and 1,170,906 teach that halogen-containing ether compounds composed of aromatic hydrocarbons and aliphatic hydrocarbons are used as flame-retardants. These compounds, however, are liquid substances or low melting crystalline substances, so that when added by use of an extrusion molding machine to synthetic resins, the compounds, which are low in melting point, melt-adhere to the hopper of the molding machine to make uniform mixing difficult. Even if the said compounds are excellent in flame-retarding effect, therefore, they are not suitable as flame-retardants for synthetic resins. Further, the above-mentioned compounds are low in melting point, so that synthetic resins incorporated with said compounds are lowered in heat distortion temperature and are undesirably varied in properties inherent to the resins. Therefore, said compounds are unsuitable. Furthermore, when synthetic resins incorporated with said compounds are allowed to stand, there is remarkably caused a so-called bleeding phenomenon, i.e. the compounds bleed on the resin surface with lapse of time, whereby the resins are gradually deprived of their flame-retarding properties.

However, the halogen-containing organic compounds represented by the Formula I which are used in the present invention are high in melting point, since the hydrocarbon groups thereof contain 4 or more carbon atoms and further contain secondary, tertiary or quaternary carbon atoms, so that they are higher in thermal decomposition temperature than straight-chain hydrocarbon group-containing compounds, as is clear also from the results of measurement according to differential thermal analysis, and hence are quite effective to make synthetic resins flame-retardant. Accordingly, synthetic resins incorporated with the halogen-containing organic compound of the Formula I display excellent effects in heat resistance, heat distortion temperature, bleeding, etc.

In case the number of carbon atoms of the hydrocarbon groups represented by B in the Formula I becomes 6 or more, there is observed such a tendency that the resins are somewhat decreased in flame-retarding property and deteriorated in heat resistance. Accordingly, the number of carbon atoms of the hydrocarbon groups represented by B in the Formula I is most preferably 4 to 5.

When the flame-retardant compounds of the present invention are added to synthetic resins, the resulting compositions are high in heat resistance and heat distortion temperature as compared with the case where such conventional flame-retardants as tetrabromobutane, tetrabromoethane, 2,3-dibromopropanol and ether compounds containing halogen-containing straight chain hydrocarbons are used. Further, the flame-retardant compounds of the present invention display prominent flame-retarding effects even when used in small amounts.

Typical embodiments of the present invention are illustrated below with reference to examples, in which the term "non-burning" refers to such a case that when the flame source is removed from the composition, the flame is instantaneously extinguished, showing neither a combustion time nor a smouldering time, and the term "self-extinguishing" refers to such a case that when the flame source is removed from the composition, the flame was spontaneously extinguished, showing a combustion time and a smouldering time between the removal of the flame source and the extinguishment. In the examples, all parts are by weight.

EXAMPLE 1

A mixture comprising 100 parts of styrene resin [Estyrene H61 (trade name)] and each of the flame-retardant compounds set forth in Table 1 was kneaded by means of a hot roll at 140° to 150° C. for 5 minutes. The resulting composition was pressed at 140° to 160° C. and 150 atm. for 3 minutes, and then subjected to a cooling screw press to form a plastic sheet. The plastic sheet was taken out of the screw press, and then cut according to the method regulated in ASTM D-635-56T to prepare a test sample (127 mm. x 12.7 mm. x 1.5 mm.), which was then subjected to combustion test. The test was effected with respect not only to the present flame-retardant compounds but also on compounds homologous thereto.

The ASTM D-635 method employed for evaluation is a plastics-testing method set forth in ASTM published by the American Society for Testing Materials.

In addition to the combustion test, there were effected heat resistance test, heat distortion temperature measurement and bleeding test. The results obtained were as shown in Table 1.

TABLE 1

| Number | Flame-retardant compound | Amount added (parts) | Combustion test | | Heat resistance test | Heat distortion temperature (° C.) | Bleeding test (percent) |
|---|---|---|---|---|---|---|---|
| | | | Evaluation | Combustion rate (cm./min.) | | | |
| Present compound: | | | | | | | |
| (1) | Monobromodichlorophenyl 2,3-dibromo-2-methylpropyl ether. | 2.0 | Non-burning | 0.0 | 3 minutes. Not colored. | 96 | 3.0 |
| (2) | Methyldibromophenyl 2,3-difluoro-2-methylpropyl ether. | 2.0 | do | 0.0 | 10 minutes. Not colored. | 97 | 2.5 |
| (3) | Methyltribromophenyl 1,2,3-tribromo-1-bromomethylpropyl ether. | 1.5 | do | 0.0 | 3 minutes. Not colored. | 98 | 3.1 |
| (4) | Tribromophenyl 2,3-dibromo-2-methylpropyl ether. | 2.0 | do | 0.0 | 5 minutes. Not colored. | 99 | 2.7 |
| (5) | Pentabromophenyl 2,3-dibromo-2-methylpropyl ether. | 1.5 | do | 0.0 | do | 98 | 2.0 |
| (6) | Chloromethoxydibromophenyl 1,2,3,3-tetrabromo-2-methylpropyl ether. | 2.0 | do | 0.0 | 3 minutes. Not colored. | 98 | 3.0 |
| (7) | Pentabromophenyl 2,2-dimethyl-3-hydroxypropyl ether. | 3.0 | do | 0.0 | 7 minutes. Not colored. | 97 | 2.3 |
| (8) | Tribromophenyl 2,2-dimethyl-3-bromopropyl ether. | 1.5 | do | 0.0 | 7 minutes. Not colored. | 97 | 1.8 |
| (9) | Tribromophenyl 2,2-di(bromomethyl)-3-bromopropyl ether. | 1.0 | do | 0.0 | 10 minutes. Not colored. | 98 | 1.3 |

See notes at end of table.

TABLE 1—Continued

| Number | Flame-retardant compound | Amount added (parts) | Combustion test Evaluation | Combustion rate (cm./min.) | Heat resistance test | Heat distortion temperature (° C.) | Bleeding test (percent) |
|---|---|---|---|---|---|---|---|
| (10) | Tribromophenyl 2,3-dibromo-2-methylpropyl thioether. | 2.5 | Non-burning | 0.0 | 5 minutes; Not colored. | 98 | 1.2 |
| (11) | Pentabromophenyl 2,3-dibromo-2-methylpropyl thioether. | 2.0 | ...do... | 0.0 | ...do... | 98 | 2.2 |
| (12) | Methyldibromophenyl 2,3-dibromo-2-methylpropyl thioether. | 2.5 | ...do... | 0.0 | ...do... | 97 | 0.1 |
| (13) | Bromophenyl 2,3-dibromo-2-methylpropyl ether. | 2.0 | ...do... | 0.0 | ...do... | 95 | 10.4 |
| (14) | Pentabromophenyl 2,2-di-(bromomethyl)-3-bromopropyl ether. | 1.0 | ...do... | 0.0 | 10 minutes. Not colored. | 98 | 1.1 |
| Control compound: | | | | | | | |
| (A) | Tribromophenyl 2,3-dibromopropyl ether (Br-C6H2Br2-O-CH2-CHBr-CH2Br) | 3.0 | Self-extinguishing. | 5.9 | 1 minute. Colored. | 84 | 68.9 |
| (B) | Tetrabromophenyl 2,3-dibromopropyl ether | 2.5 | ...do... | 4.8 | ...do... | 88 | 47.5 |
| (C) | Tribromophenol | 7.0 | Burning | 7.2 | ...do... | 90 | 70.3 |
| (D) | 1,2,3,4-tetrabromobutane (CH2Br-CHBr-CHBr-CH2Br) | 5.0 | Self-extinguishing. | 4.3 | 1 minute. Quite vigorously colored. | 95 | 792. |
| (E) | 2,3-dibromopropanol (CH2Br-CHBr-CH2OH) | 6.0 | ...do... | 5.0 | ...do... | 83 | 80.7 |
| (F) | Tetrabromophenyl allyl ether | 3.0 | ...do... | 5.0 | 1 minute. Colored. | 84 | 65 |

See notes at end of table.

3,728,304

TABLE 1—Continued

| Number | Flame-retardant compound | Amount added (parts) | Combustion test Evaluation | Combustion rate (cm./min.) | Heat resistance test | Heat distortion temperature (° C.) | Bleeding test (percent) |
|---|---|---|---|---|---|---|---|
| (G) | 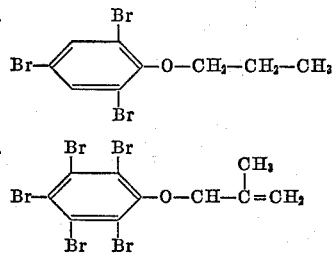 Br, Br, Br—C₆H₂—O—CH₂—CH₂—CH₃ | 3.5 | Non-burning | 6.8 | 5 minutes. Colored. | 80 | 74 |
| (H) | Br, Br, Br, Br—C₆Br₄—O—CH—C(CH₃)=CH₂ | 3.0 | ...do... | 5.0 | 1 minute. Colored. | 88 | 4.5 |
|  |  |  | Burning | 16.0 |  | 99 | 0.0 |

NOTE.—Combustion test: ASTM–D635–56T. Heat resistance test: A test piece was hot pressed by use of a hot press under the conditions of 150 kg./cm.² and 200° C., and the coloration thereof was evaluated in comparison with that of the blank.
Bleeding test: A test sheet 160 mm. x 160 mm. x 1 mm.) was allowed to stand overnight in a desiccator, precisely weighed and then allowed to stand in a dry oven at 80° C. for 3 weeks. Thereafter, the test sheet was taken out of the oven, cleaned on both sides with absorbent cotton, allowed to stand overnight in a desiccator and then precisely weighed, and the variation in weight of the test piece was read.

$$A = \frac{\frac{B}{B_0} \times (W_0 - W)}{Y} \times 100 \text{ (percent)}$$

A = The percentage of bled flame-retardant compound.
$B_0$ = The weight of blank resin sheet before test.
B = The weight of blank resin sheet after test.
$W_0$ = The weight of flame-retardant-incorporated resin sheet before test.
W = The weight of flame-retardant-incorporated resin sheet after test.
Y = The weight of flame-retardant compound in flame-retardant-incorporated resin sheet before test.

EXAMPLE 2

In the same manner as in Example 1, the resins set forth in Table 2 were individually kneaded for 5 minutes with each of the flame-retardant compounds shown in said table by use of a hot roll at respective molding temperatures. Subsequently, the mixtures were pressed and molded by means of a hot press under 150 atm. for 5 minutes, and then subjected to combustion test according to ASTM–D635–56T. The results obtained were as set forth in Table 2.

TABLE 2

| Resin | Flame-retardant compound | Amount added (parts) | Roll temperature (° C.) | Press temperature (° C.) | Combustion test Evaluation | Combustion rate (cm./min.) |
|---|---|---|---|---|---|---|
| Polyethylene [Sholex 5003 (trade name)] | (7) | 5 | 160–170 | 170 | Non-burning | 0.0 |
| Polypropylene [Noblen MH4 (trade name)] | (7) | 5 | 180–200 | 200–210 | ...do... | 0.0 |
| AS resin [Estyrene AS (trade name)] | (3) | 5 | 170–180 | 180 | ...do... | 0.0 |
| Polyvinyl chloride [Kanevinyl S-1007 (trade name)] | (3) | 5 | 150–160 | 150–160 | ...do... | 0.0 |
| ABS resin [JSR-ABS #15 (trade name)] | (8) | 5 | 170–180 | 200 | ...do... | 0.0 |
| Methyl acrylate resin (MW=700,000) | (5) | 5 | 65–75 | 65 | ...do... | 0.0 |

NOTE.—The amount added is per 100 parts of the resin used. The flame-retardant compound is represented by the number of the flame-retardant compound shown in Table 1. The AS resin is a 20:80 copolymer of acrylonitrile and styrene. The ABS resin is a 50:20:30 terpolymer of acrylonitrile, butadiene and styrene.

EXAMPLE 3

2,000 parts of water, 6 parts of a copolymer comprising 95% of N-vinylpyrrolidone and 5% of methyl acrylate, 1 part of sodium pyrophosphate, 1,940 parts of methyl methacrylate, 6 parts of benzoyl peroxide and 97 parts of the flame-retardant compound (8) shown in Table 1 were vigorously stirred in a reactor and polymerized in a suspension state at 70° C. for 10 hours and then at 80° C. for 5 hours. The resulting polymer particles were separated, washed, dried and then molded in the same manner as in Example 1 into a flame-retardant resin piece by use of a hot roll, and the resin piece was subjected to combustion test according to ASTM–D635–56T.

For comparison, a resin piece incorporated with no flame-retardant compound was prepared in the same manner as above and subjected to the same test.

The results obtained were as shown in Table 3.

TABLE 3

| Flame-retardant compound | Combustion test Evaluation | Combustion rate (cm./min.) |
|---|---|---|
| Compound (8) | Non-burning | 0.0 |
| None | Burning | 10.0 |

EXAMPLE 4

20,000 parts of water, 6 parts of a copolymer comprising 95% of N-vinylpyrrolidone and 5% of methyl acrylate, 2 parts of sodium pyrophosphate, 19,400 parts of styrol, 1,500 parts of pentane, 62 parts of benzoyl peroxide and 600 parts of the flame-retardant compound (3) set forth in Table 1 were polymerized in a pressure oven equipped with a stirrer at 70° C. for 20 hours and then at 10 hours, while introducing nitrogen gas under 2 atm., to obtain a polymer in the form of globules of about 0.5 to 1 mm. in diameter. The polymer was separated, washed and then dried in air at 50° C. The thus obtained polymer particles were heated and extended with steam at 100° C. for 10 minutes, and the resulting prefoam was allowed to stand at normal temperature for at least 5 hours, charged into a mold, heated with hot steam at 1 atm. for 90 seconds, and then cooled to normal temperature to obtain a desired flame-retardant foamed polystyrene. Subsequently, the foamed polystyrene was subjected to combustion test according to the foamed polystyrene insulator burning test method regulated in "JISA–9511–1965." The results obtained were as shown in Table 4.

TABLE 4

| Flame-retardant compound | Combustion test Evaluation | Combustion rate (cm./min.) |
|---|---|---|
| Compound (3) | Non-burning | 0.0 |
| None | Burning | 18.1 |

EXAMPLE 5

A mixture comprising 100 parts of expansible polystyrene particles [Kanepar (trade name)] and 4.5 parts of the flame-retardant compound (9) set forth in Table 1 was sufficiently stirred in a beaker at normal temperature to uniformly coat the polystyrene particle surfaces with the flame-retardant compound. The surface-treated polystyrene particles were heated and expanded with steam at 100° C. for 10 minutes, and the resulting pre-foam was allowed to stand at normal temperature for at least 5 hours, charged in a mold, heated with hot steam at 1 atm. for 90 seconds, and then cooled to normal temperature to obtain a desired flame-retardant foamed polystyrene. Subsequently, the foamed polystyrene was subjected to the same combustion test as in Example 4. The results obtained were as shown in Table 5.

EXAMPLE 7

A mixture comprising 100 parts of styrene resin [Estyrene H61 (trade name)] and each of the flame-retardant compounds and additives set forth in Table 7 was kneaded by means of a roll in the same manner as in Example 1, and then molded. The molded article was subjected to combustion test and heat resistance test to obtain the results as shown in Table 7.

TABLE 7

| Flame-retardant compound and amount added (part) | Additive and amount added (part) | Combustion test Evaluation | Combustion rate (cm./min.) | Heat resistance test |
| --- | --- | --- | --- | --- |
| (4), 3 | Dibutyltin dilaurate, 1.0 | Non-burning | 0.0 | 10 minutes. Not colored. |
| (5), 3 | Dibutyltin fumarate, 1.5 | do | 0.0 | Do. |
| (8), 3 | Triphenyl thionophosphate, 1.0 | do | 0.0 | 7 minutes. Not colored. |
| (1), 3 | Antimony trioxide, 1.3 | do | 0.0 | 10 minutes. Not colored. |
| (2), 1 | Tris-2,3-dibromopropyl phosphate, 1.0 | do | 0.0 | 3 minutes. Not colored. |
| (8), 2 | Hexabromocyclododecane, 2.0 | do | 0.0 | 10 minutes. Not colored |

NOTE.—The flame-retardant compound is represented by the number of the flame-retardant compound set forth in Table 1

TABLE 5

| Flame-retardant compound | Combustion test Evaluation | Combustion rate (cm./min.) |
| --- | --- | --- |
| Compound (9) | Non-burning | 0.0 |
| None | Burning | 17.0 |

EXAMPLE 6

A homogeneous mixture comprising 100 parts of unsaturated polyester [Polylite 76 (trade name)], 5 parts of the flame-retardant compound (3) set forth in Table 1 and 3 parts of methylethylketone peroxide as a catalyst was sufficiently stirred together with 3 parts of cobalt naphthenate as a promoter to prepare a resin liquid. This resin liquid was poured into a Teflon-coated, resin-molding mold of 14.5 cm. in length and 11.8 cm. in width, and then allowed to stand at normal temperature to form a solid resin sheet of 14.5 cm. in length, 11.8 cm. in width and 0.2 to 0.25 cm. in thickness. The resin sheet was allowed to stand overnight, subjected to after-curing for 1 hour in a drier at 100° C., and then cut to a test piece of 14.0 cm. in length, 1.3 cm. in width and 0.2 to 0.25 cm. in thickness. This test piece was subjected to combustion test according to ASTM-D635-56T to obtain the results as shown in Table 6.

The above-mentioned unsaturated polyester composition was colorless and transparent.

TABLE 6

| Flame-retardant compound | Combustion test Evaluation | Combustion rate (cm./min.) |
| --- | --- | --- |
| Compound (3) | Non-burning | 0.0 |
| None | Burning | 15.0 |

EXAMPLE 8

A homogeneous mixture comprising 100 parts of polystyrene resin [Estyrene H61 (trade name)] chips and 4 parts of each of the flame-retardant compounds (4), (A) and (C) set forth in Table 1 was formed into flame-retardant polystyrene chips by use of an extrusion molding machine. These chips were shaped by means of an injection molding machine into a flame-retardant polystyrene resin piece, which was then subjected to flame-retardancy test according to ASTM-D635-56T. Further, the halogen content of the polystyrene resin was measured according to Carius method. The results obtained were as shown in Table 8, in which are also shown the melting point of each flame-retardant compound and the state thereof at the time of resin molding.

Extrusion molding conditions: °C.
  Hopper-side cylinder temperature _____ 140–160
  Central cylinder temperature _____ 160–180
  Die temperature _____ 160–180
Injection molding conditions:
  Cylinder temperature _____ 180
  Mold temperature _____ 60
  Injection pressure: 700–800 kg./cm.$^2$.

TABLE 8

| Flame-retardant compound | Melting point (° C.) | Halogen content of resin, percent [1] | Resin molding state | Combustion test Evaluation | Combustion rate (cm./min.) |
| --- | --- | --- | --- | --- | --- |
| (4) | 84.0 | 2.80 (2.82) | No question | Non-burning | 0.0 |
| (A) | 37.5 | 1.80 (2.90) | The compound fused to the hopper to make homogeneous mixing impossible. | Self-extinguishing. | 8.7 |
| (C) | 94.0 | 2.69 (2.79) | The resin was low in heat resistance and corroded a part of the metal mold of injection molding machine. | Burning | 10.0 |

[1] Parenthesized numeral is theoretical.

EXAMPLE 9

A solution of 10 parts of acrylonitrile resin (MW: 300,000) and 0.3 part of the flame-retardant compound (4) set forth in Table 1 in 100 parts of dimethylformamide was flowed on the surface of a horizontally placed glass plate. Subsequently, the glass plate was placed in a desiccator, and the pressure was gradually reduced. The glass plate was allowed to stand at room temperature 30° C. under a reduced pressure of 10 mm. Hg for 24 hours, and then dried under 1 mm. Hg for 24 hours to completely remove the solvent from the solution. Thereafter, the resulting film sheet was peeled off from the glass plate. In the same manner as above, a film sheet incorporated with no flame-retardant was prepared.

Each of the thus prepared films was cut to a size of 30 mm. x 150 mm., vertically suspended and ignited at the lower end by means of a city gas burner generating a flame of about 25 mm. in height and 10 mm. in diameter. Immediately after the ignition, the burner was removed, and the burning time of the film was measured.

As the result, the flame-retardant-treated film showed a burning time of 3.0 seconds and was self-extinguished, whereas the untreated film was completely burnt within a burning time of 2.8 seconds.

EXAMPLE 10

100 parts of an aqueous emulsion-polymerized vinyl acetate solution (resin concentration 50%) [Polysol S6 (trade name)] was sufficiently stirred together with 6 parts of the flame-retardant compound (4) set forth in Table 1. This solution was flowed on the surface of a horizontally placed glass plate, and then allowed to stand at room temperature for 3 days to remove the water solvent, whereby a film was formed. The thus formed film was sufficiently dried in a reduced pressure drier, and then subjected to the same combustion test as in Example 9. As the result, the flame-retardant-treated film was self-extinguished, whereas an untreated film was burnt.

What is claimed is:
1. A flame-retarding composition comprising polystyrene and a flame-retardant compound for said polystyrene selected from the group consisting of monobromodichlorophenyl 2,3-dibromo-2-methylpropyl ether,
methyldibromophenyl 2,3-difluoro-2-methylpropyl ether,
methyltribromophenyl 1,2,3-tribromo-1-bromomethylpropyl ether,
tribromophenyl 2,3-dibromo-2-methylpropyl ether,
pentabromophenyl 2,3-dibromo-2-methylpropyl ether,
chloromethoxydibromophenyl 1,2,3,3-tetrabromo-2-methylpropyl ether,
tribromophenyl 2,2-dimethyl-3-bromopropyl ether,
tribromophenyl 2,2-di-(bromomethyl)-3-bromopropyl ether,
tribromophenyl 2,3-dibromo-2-methylpropyl thioether,
pentabromophenyl 2,3-dibromo-2-methylpropyl thioether,
methyldibromophenyl 2,3-dibromo-2-methylpropyl thioether,
bromophenyl 2,3-dibromo-2-methylpropyl ether or
pentabromophenyl 2,2-di-(bromomethyl)-3-bromopropyl ether.

2. A composition according to claim 1, wherein the amount of halogen-containing organic compound is 0.5 to 20% by weight based on the weight of the composition.
3. A flame-retardant article obtained from the composition set forth in claim 1.
4. A flame-retarding composition comprising polystyrene, a flame-retardant compound for said polystyrene, said flame-retardant compound being selected from the group consisting of monobromodichlorophenyl 2,3-dibromo-2-methylpropyl ether,
methyldibromophenyl 2,3-difluoro-2-methyl propyl ether,
methyltribromophenyl 1,2,3-tribromo-1-bromomethylpropyl ether,
tribromophenyl 2,3-dibromo-2-methylpropyl ether,
pentabromophenyl 2,3-dibromo-2-methylpropyl ether,
chloromethoxydibromophenyl 1,2,3,3-tetrabromo-2-methylpropyl ether,
tribromophenyl 2,2-dimethyl-3-bromopropyl ether,
tribromophenyl 2,2-di-(bromomethyl)-3-bromopropyl ether,
tribromophenyl 2,3-dibromo-2-methylpropyl thioether,
pentabromophenyl 2,3-dibromo-2-methylpropyl thioether,
methyldibromophenyl 2,3-dibromo-2-methylpropyl thioether,
bromophenyl 2,3-dibromo-2-methylpropyl ether or
pentabromophenyl 2,2-di-(bromomethyl)-3-bromopropyl ether, and at least one flame-retarding adjuvant selected from the group consisting of dibutyltin dilaurate, dibutyltin fumarate, triphenyl thionophosphate, tris-2,3-dibromopropyl phosphate, and hexabromocyclododecane.

5. A composition according to claim 4, wherein the amount of the halogen-containing organic compound is 0.5 to 20% by weight based on the weight of the composition.
6. A composition according to claim 4, wherein the adjuvant is present in the amount of from about 1 to about 2 parts per 100 parts of said polystyrene.
7. A composition according to claim 4, wherein the halogen-containing organic compound is tribromophenyl 2,3-dibromo-2-methylpropyl ether.
8. A flame-retardant article obtained from the composition set forth in claim 4.

References Cited

UNITED STATES PATENTS

| | | | |
|---|---|---|---|
| 3,418,263 | 12/1968 | Hindersinn et al. | 260—23 |
| 3,432,461 | 3/1969 | Hill et al. | 260—45.75 |
| 3,530,090 | 9/1970 | Savides | 260—45.8 |
| 3,631,132 | 12/1971 | Westernacher | 260—2.5 |
| 3,075,944 | 1/1963 | Wick et al. | 260—41 |
| 3,004,935 | 10/1961 | Raley, Jr. et al. | 260—2.5 |
| 3,347,822 | 10/1967 | Jenkner | 260—45.75 |
| 2,594,935 | 4/1952 | Ladd et al. | 260—612 |
| 2,186,367 | 1/1940 | Coleman et al. | 260—612 |
| 3,372,141 | 3/1968 | Dickerson et al. | 260—45.95 |
| 2,072,797 | 3/1937 | Clark et al. | 260—612 |

DONALD E. CZAJA, Primary Examiner

R. A. WHITE, Assistant Examiner

U.S. Cl. X.R.

260—45.7 P, 45.7 R, 45.95